United States Patent [19]

Coon, III

[11] Patent Number: 5,386,208
[45] Date of Patent: Jan. 31, 1995

[54] VEHICLE LIGHT MONITORING APPARATUS

[76] Inventor: Richard L. Coon, III., HC 65, Box 309, Moorefield, W. Va. 26836

[21] Appl. No.: 48,312

[22] Filed: Apr. 19, 1993

[51] Int. Cl.⁶ .......................... B60Q 1/00; G09F 9/00
[52] U.S. Cl. .................................. 340/461; 340/458; 340/815.42; 340/815.47
[58] Field of Search ............... 340/458, 459, 641, 642, 340/815.31, 815.12, 555

[56] References Cited

U.S. PATENT DOCUMENTS

| | | | |
|---|---|---|---|
| 1,751,584 | 3/1930 | Hansell | 340/815.31 |
| 3,355,708 | 11/1967 | Perry | 340/458 |
| 3,532,873 | 10/1970 | Batson et al. | 340/815.31 |
| 3,569,933 | 3/1971 | Longenecker | 340/458 |

Primary Examiner—John K. Peng
Assistant Examiner—Daryl C. Pope
Attorney, Agent, or Firm—E. Michael Combs

[57] ABSTRACT

A fiber optic cable sheath includes a predetermined number of fiber optic cables, with each of the cables arranged such that a first end of each fiber optic cable is received within a display panel within a passenger compartment of the associated vehicle, wherein a second end of each cable is arranged in a facing confronting relationship relative to each light member of a predetermined number of lights of the vehicle such that extinguishing of any of the light members is immediately illustrated in the panel upon failure of light to be transmitted through that individual fiber optic cable.

2 Claims, 4 Drawing Sheets

VEHICLE LIGHT MONITORING APPARATUS

BACKGROUND OF THE INVENTION

1. Field of the Invention

The field of invention relates to vehicular illumination structure, and more particularly pertains to a new and improved vehicular light monitoring apparatus wherein the same is arranged to monitor the functioning of individual light members relative to an associated vehicle.

2. Description of the Prior Art

Vehicles, and particularly truck members, are required to maintain operation of exterior lighting structure. The lighting structure is directed along the vehicular cab as well as a tailoring organization. The instant invention provides for monitoring structure for indicating the effective operation of such lights during use. Prior art light monitoring structure is indicated in the U.S. Pat. No. 3,588,816 for checking of filaments within individual illumination bulbs.

The instant invention attempts to overcome deficiencies of the prior art by providing for a retrofit structure arranged for ease of monitoring of illumination members of an associated vehicle and in this respect, the present invention substantially fulfills this need.

In addition, a variation of this system replaces much of a vehicle's electrical lighting circuits with optical circuits. In this system an optical fibre would transmit light from a single bulb in a driving compartment to the respective exterior lenses such as cab and clearance lights. Benefits of this variation are as follows:

1. The optical circuit would be immensely more reliable and more durable than an electrical system.
2. One light bulb, accessible from the driver's seat, and visible from the driver's seat, would replace as many as twenty exterior light bulbs presently required on tractor, semi-trailer and busses.
3. Use of this system on flammable bulk tanks and explosive transport vehicles would vastly reduce the risk of electrical sparks and heat from bulbs and filaments from causing explosion and fire hazards.
4. Personnel safety would be enhanced by reducing the need or eliminating the need for climbing ladders to replace trailer lights.
5. Fleet safety and repair efficiency would be enhanced because the driver would immediately detect a defective light and be able to change it within minutes instead of running several hundred miles without lights to a repair shop.
6. The optical circuits would be impervious to the weather. This benefit alone would make this idea perfect for boat trailer lights since submergence during loading and unloading would be absolutely harmless to the optical filaments.

SUMMARY OF THE INVENTION

In view of the foregoing disadvantages inherent in the known types of vehicle light monitoring apparatus now present in the prior art, the present invention provides a vehicular light monitoring apparatus wherein the same is arranged to include individual fiber optic cables to monitor individual illumination structure of an associated vehicle. As such, the general purpose of the present invention, which will be described subsequently in greater detail, is to provide a new and improved vehicular light monitoring apparatus which has all the advantages of the prior art vehicular light monitoring apparatus and none of the disadvantages.

To attain this, the present invention provides a fiber optic cable sheath including a predetermined number of fiber optic cables, with each of the cables arranged such that a first end of each fiber optic cable is received within a display panel within a passenger compartment of the associated vehicle, wherein a second end of each able is arranged in a facing confronting relationship relative to each light member of a predetermined number of lights of the vehicle such that extinguishing of any of the light members is immediately illustrated in the panel upon failure of light to be transmitted through that individual fiber optic cable.

My invention resides not in any one of these features per se, but rather in the particular combination of all of them herein disclosed and claimed and it is distinguished from the prior art in this particular combination of all of its structures for the function specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended thereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular light monitoring apparatus which has all the advantages of the prior art vehicular light monitoring apparatus and none of the disadvantages.

It is another object of the present invention to provide a new and improved vehicular light monitoring apparatus which may be easily and efficiently manufactured and marketed.

It is a further object of the present invention to provide a new and improved vehicular light monitoring apparatus which is of a durable and reliable construction.

An even further object of the present invention is to provide a new and improved vehicular light monitoring apparatus which is susceptible of a low cost of manufacture with regard to both materials and labor, and which accordingly is then susceptible of low prices of sale to the consuming public, thereby making such vehicular light monitoring apparatus economically available to the buying public.

Still yet another object of the present invention is to provide a new and improved vehicular light monitoring apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
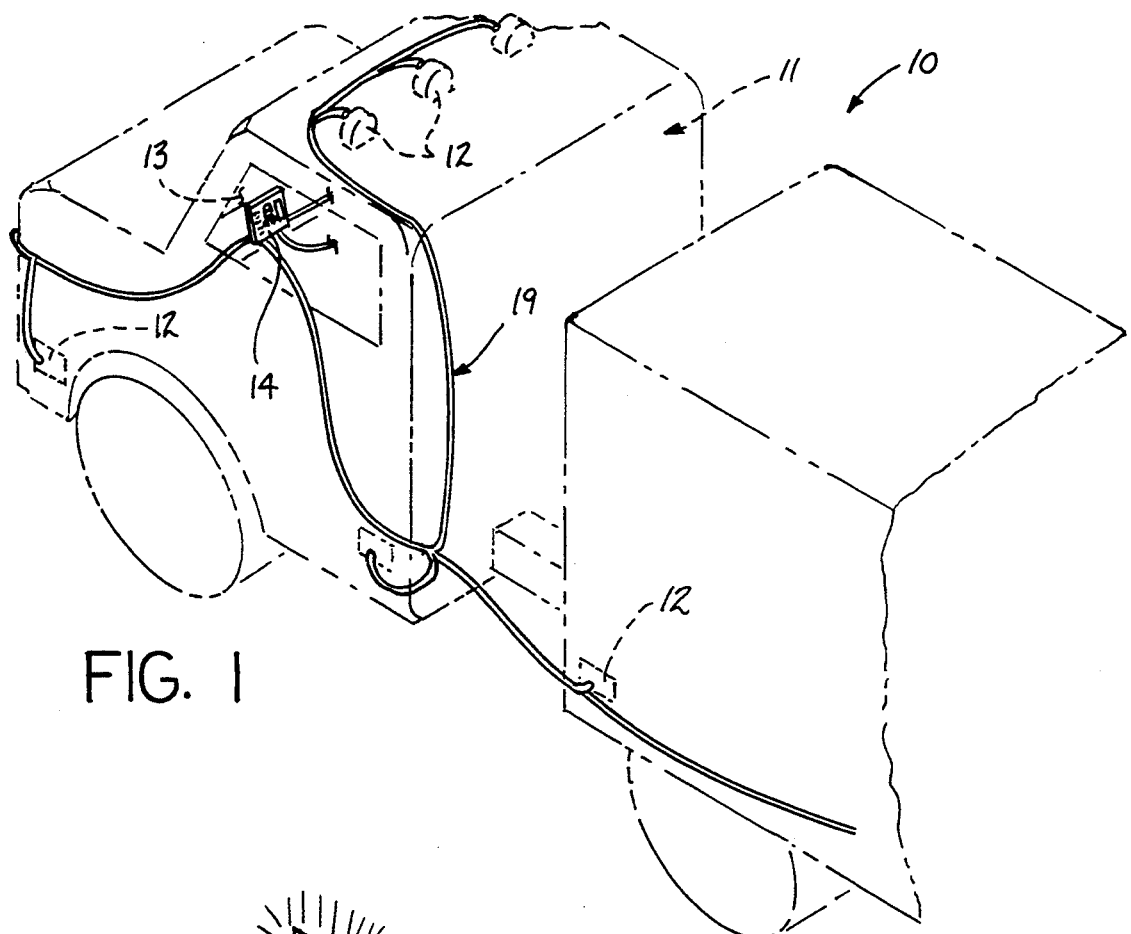
FIG. 1 is an isometric illustration of the invention.

With reference now to the drawings, and in particular to FIGS. 1 to 8 thereof, a new and improved vehicular light monitoring apparatus embodying the principles and concepts of the present invention and generally designated by the reference numeral 10 will be described.

Figure 2:
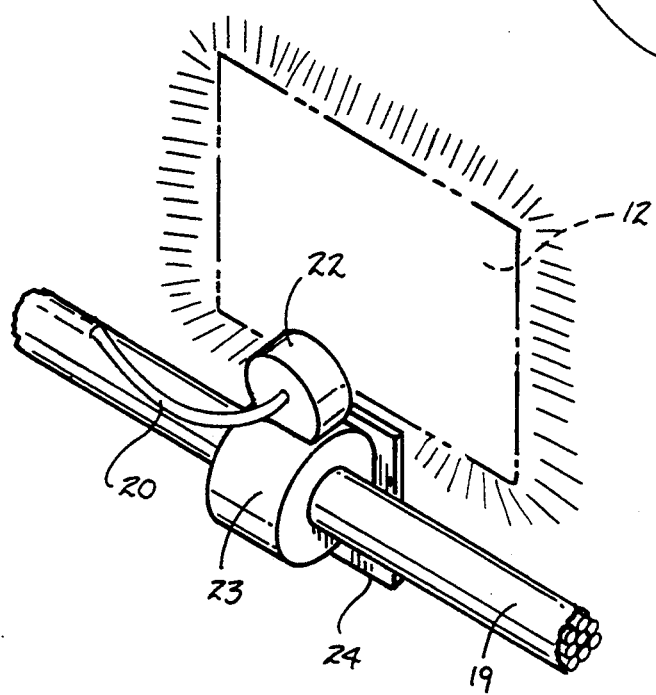
FIG. 2 is an enlarged orthographic view of an individual light member and associated individual fiber optic cable in a facing relationship to that light member.
Figure 3:
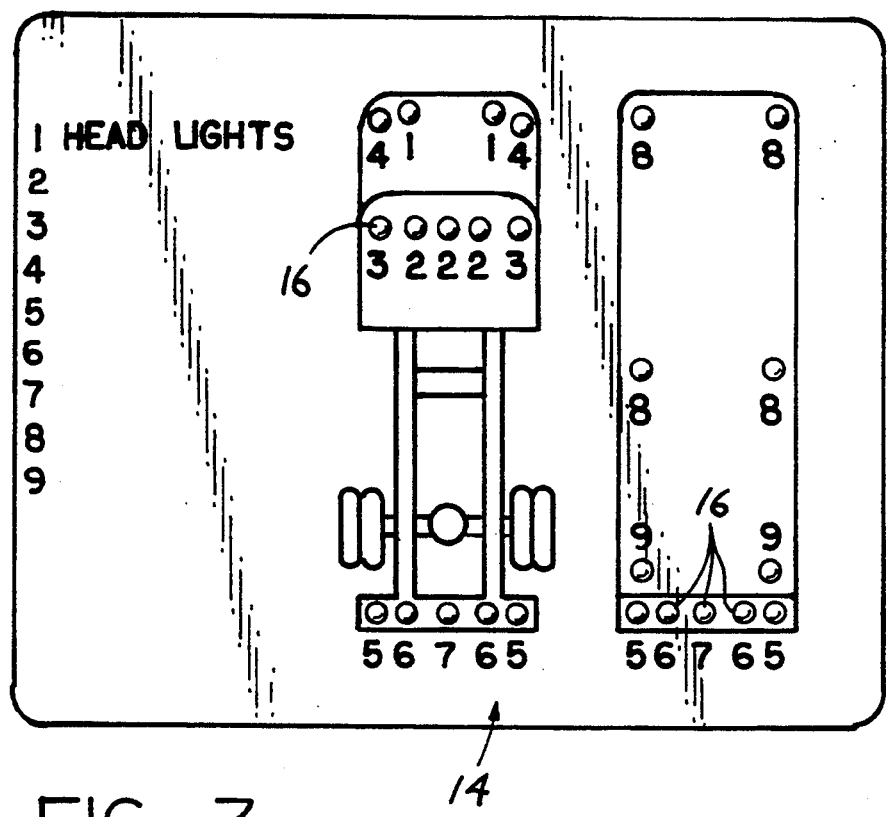
FIG. 3 is an orthographic view of the indicator panel structure.
Figure 4:
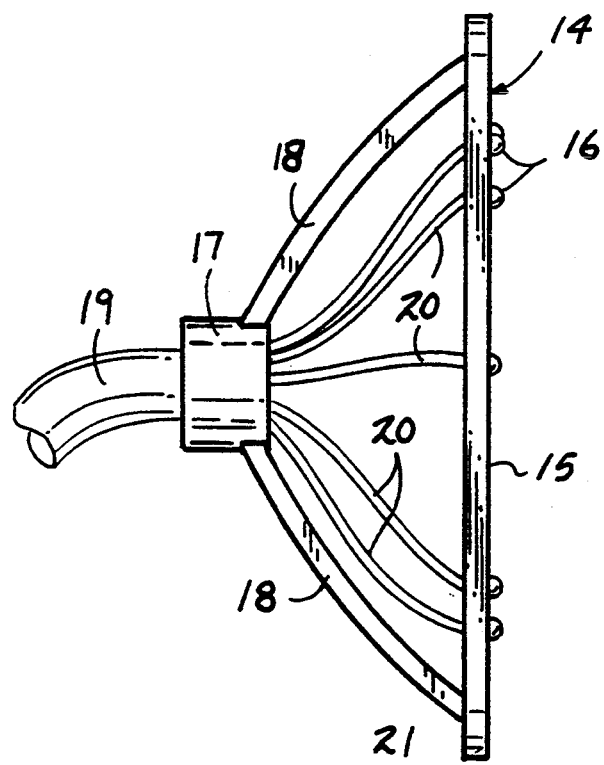
FIG. 4 is an orthographic side view of the indicator panel structure.
Figure 5:
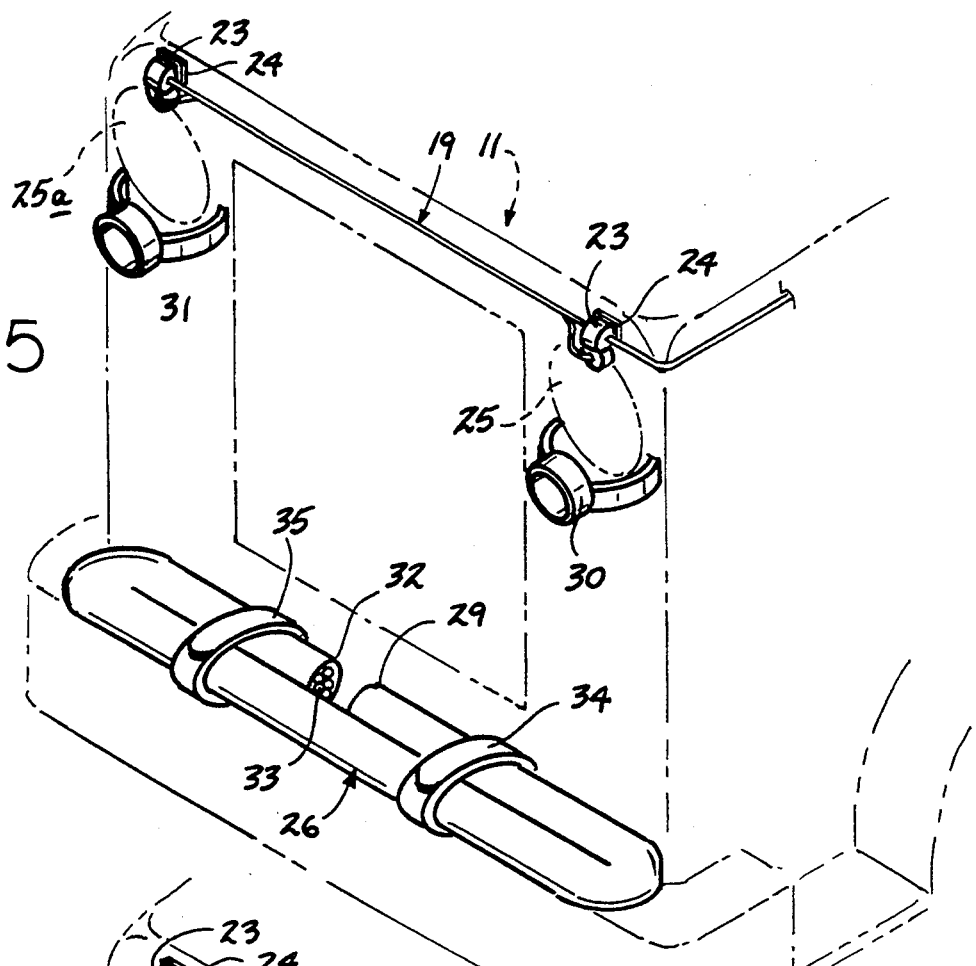
FIG. 5 is an isometric illustration of the invention further employing a second cable sheath.
Figure 6:
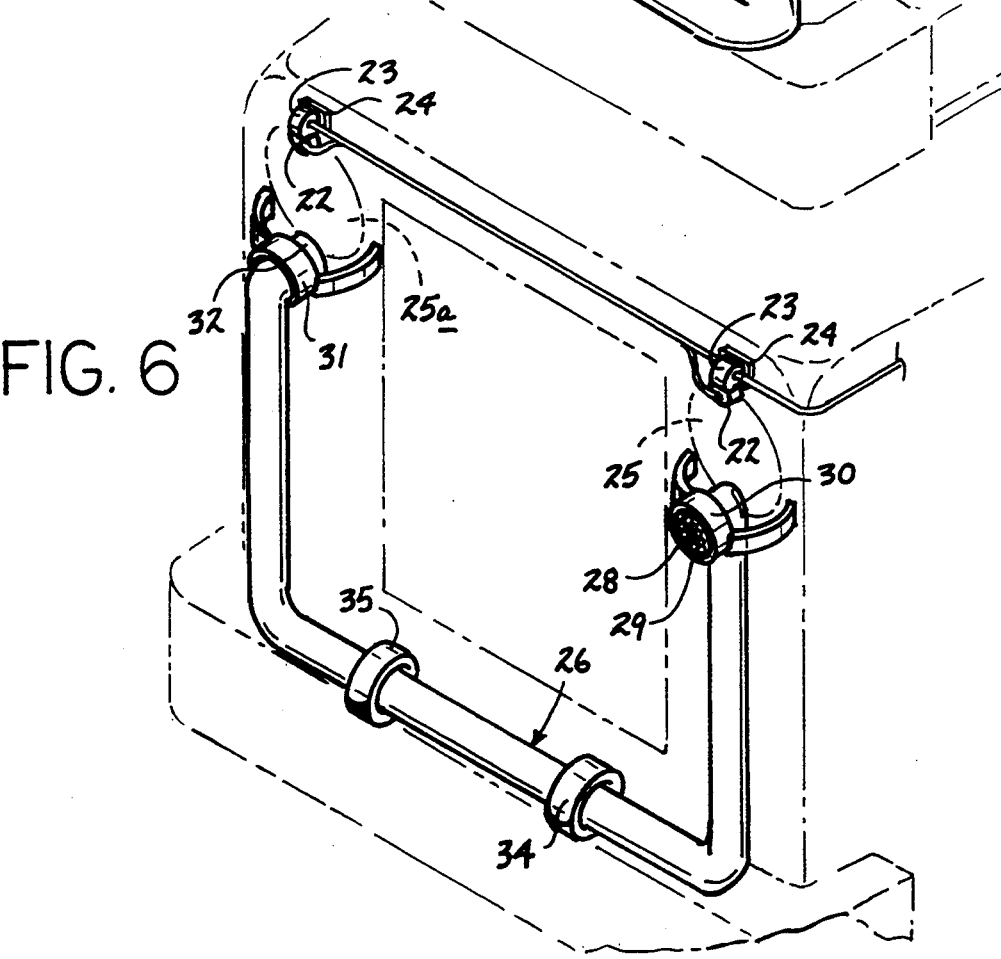
FIG. 6 is an isometric illustration of the invention indicating the second cable sheath in operative communication between a plurality of first and second cab lights.

More specifically, the vehicular light monitoring apparatus 10 of the instant invention essentially comprises cooperation with a vehicle 11, having a predetermined number of light members 12. Further, the vehicle includes a passenger compartment 13 for mounting an indicator panel plate 14 therewithin. Reference to FIGS. 3 and 4 indicates the panel plate 14 having a front wall 15 spaced from a rear wall 21, with a rigid collar 17 positioned in a spaced adjacency relative to the rear wall 21, with the rigid collar 17 including a plurality of collar legs 18 extending from the rigid collar 17 to the rear wall 21 to fixedly orient the rigid collar 17 in a spaced relationship to the rear wall 21. A cable member 19 is provided, having a predetermined number of fiber optic cables 20 directed therethrough, with each of the fiber optic cables 20 including a first end directed into the panel plate 14 extending to the panel plate and received within an individual transparent dome member 16 of a plurality of such dome members, wherein the dome members 16 are equal to said predetermined number of said light members 12, as well as fiber optic cables 20 to provide an individual fiber optic cable 20 for each of the light members 12. An end of each fiber optic cable 20 is directed from the cable member 19 in a facing relationship to an individual one of the light members 12, such as indicated in FIG. 2. The second end is directed through a support housing 22 that is mounted to an individual support collar 23, that in turn is secured to a mounting plate 24 for securement to the vehicle 11. In this manner, upon undesired extinguishing of an individual light member 12, that associated fiber optic cable 20 ceases to transmit light from its second end to its first end, and as the individual first ends are enumerated within individual transparent dome members 16, immediate indication as to which particular light member has been extinguished is immediately realized within the passenger compartment 13 of the associated vehicle 11.

The FIGS. 5–8 indicate the use of a second fiber optic cable sheath 26 mounted in adjacency relative to the vehicular cab first and second lights 25 and 25a. As the individual cab lights are of need and use, the second fiber optic cable sheath 26 of flexible material is mounted to respective first and second support straps 34 and 35 to the associated vehicle 11 in adjacency to the first and second cab lights 25 and 25a. A matrix of second fiber optic cable members are directed within the second cable sheath 26, having fiber optic cable second fiber optic cable member first ends 28 and second fiber optic cable second ends 33. Upon undesired extinguishing of an individual of the first and second cab lights 25 and 25a, and in addition to the monitoring structure, the sheath first and second ends 28 and 32 respectively are released relative to the straps 35 and 34, with the sheath first end 29 directed through a first support ring 30, and the sheath second end 32 directed through a second support ring 31 that are positioned in adjacency relative to the respective first and second cab lights 25 and 25a. In this manner, should the second cab light 25a be functioning and the first cab light 25 be extinguished, the fiber optic cable first ends 28 are directed in a first direction relative to the vehicle 11, with the sheath second end 32 directed in a first position in facing relationship relative to the second light to thereby provide for an emergency first light as the fiber optic cable first ends 28 are then visible in association from light received from the cab second light 25a.

Figure 7:
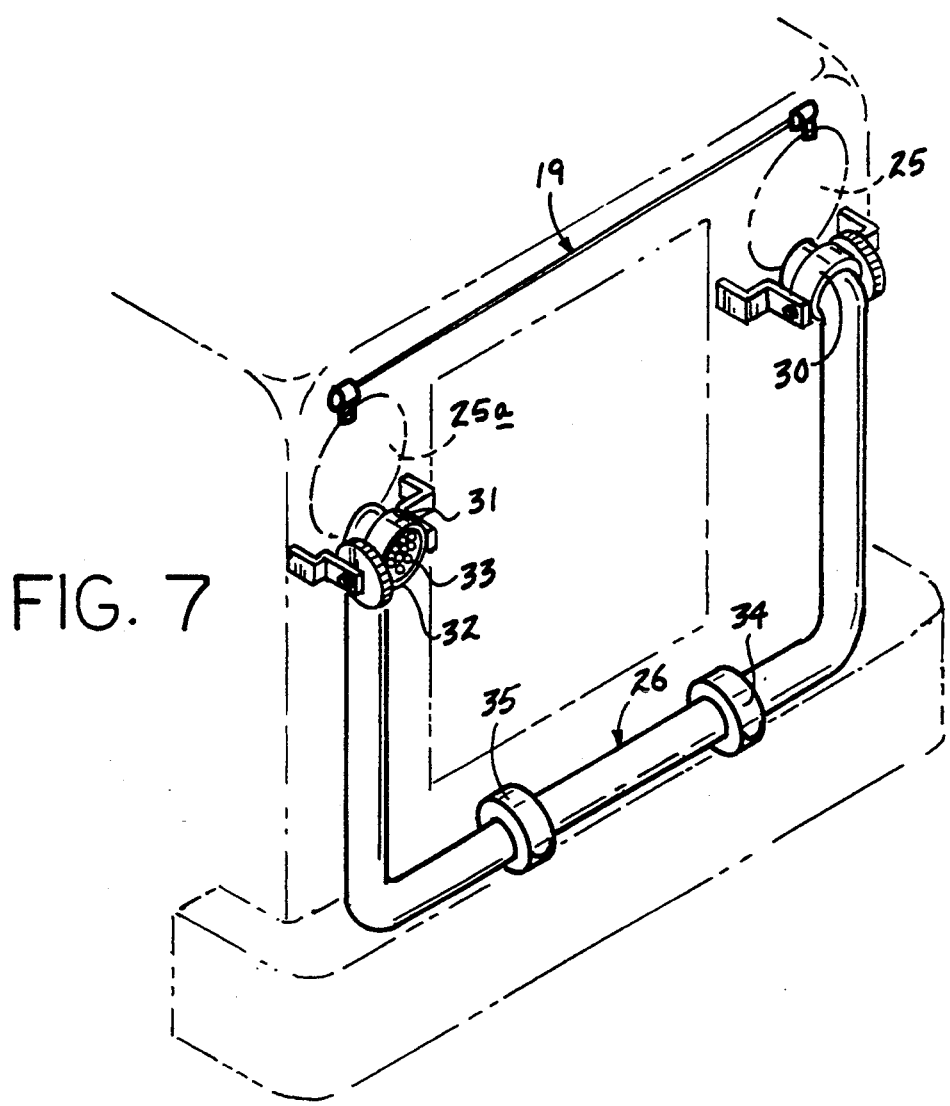
FIG. 7 is an isometric illustration of the further cable member having swivel connections at the first and second cab lights.
Figure 8:
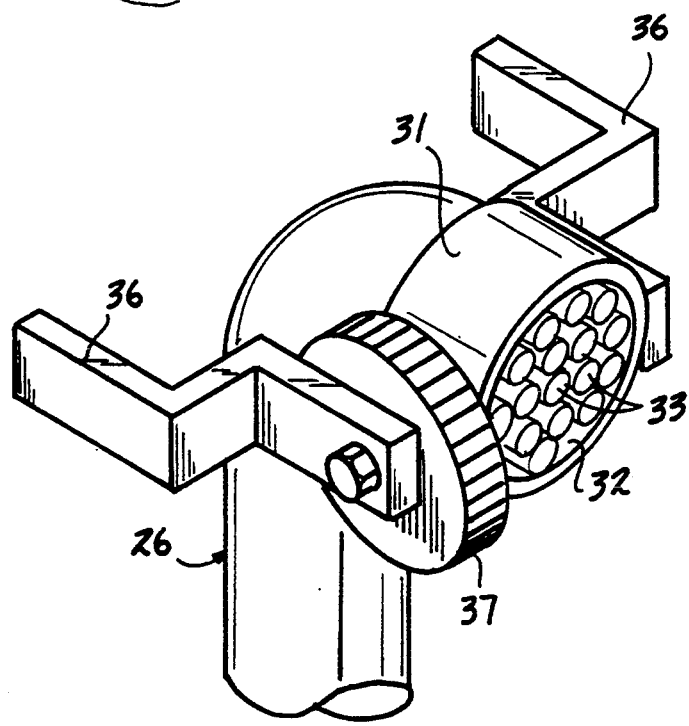
FIG. 8 is an enlarged isometric illustration of a second end of the further cable mounted in a swivel connection relative to the associated cab structure.

The FIGS. 7 and 8 indicate the use of the first and second support rings 30 and 31, each including a plurality of spaced bracket plates 36, with one of the bracket plates including a rotary disc 37 mounting an associated sheath end portion to permit rotation of the sheath end towards or away from the associated light member to provide for ease of cooperation of the first and second ends to provide for visible light rearwardly of the associated vehicle 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular light monitoring apparatus, comprising in combination with a vehicle having a predetermined number of vehicle light members, and a passenger compartment, wherein the apparatus further comprises, an indicator panel plate mounted within the passenger compartment, having a panel plate front wall and a panel plate rear wall, and a rigid collar mounted to the indicator panel plate in a spaced relationship relative to the panel plate rear wall, with the rigid collar including at least one collar leg fixedly mounted to the collar and extending from the collar to the panel plate rear wall, and the panel plate including a plurality of panel plate apertures directed therethrough, equal to a predetermined number, wherein each of the apertures includes a transparent dome member projecting from the panel plate front wall over said apertures, and a cable member mounted within the rigid collar, the cable member having a plurality of fiber optic cables therewithin equal to said predetermined number, with each of the fiber optic cables including a cable first end directed through said aperture and received within one of said dome members, and each of the fiber optic cables is directed through said cable member and includes a cable second end positioned in adjacency to one of said light members, and each of said light members having an adjacent support housing, with each said cable second end directed through the support housing in facing relationship housing includes a support collar fixedly securing the support housing, and the support collar including a mounting plate affixed to the vehicle, and the vehicle further including a first cab light and a second cab light, and a fiber optic cable sheath mounted to said vehicle in adjacency to said first cab light and second cab light, wherein the fiber optic cable sheath includes a matrix of sheath fiber optic cable members directed therethrough, wherein the sheath fiber optic cable members includes sheath fiber optic cable members first ends and sheath fiber optic cable members second ends, wherein the sheath fiber optic cable members first ends are directed through a sheath first end, and the sheath fiber optic cable members second ends are directed through a sheath second end, and the fiber optic cable sheath includes a first support strap and a second support strap mounted to the vehicle securing the fiber optic cable sheath, and the first cab light includes a first support ring mounted in adjacency relative to the first cab light, and a second support ring mounted in adjacency relative to the second cab light, wherein the sheath first end is arranged for reception through the first support ring, and the sheath second end is arranged for reception through the second support ring.

2. An apparatus as set forth in claim 1 wherein the first support ring includes first spaced bracket plates, and the second support ring includes second spaced bracket plates, wherein the first spaced bracket plates includes a first rotary disc, and the second spaced bracket plates includes a second rotary disc, wherein the second rotary disc and the first rotary disc are arranged for rotatably mounting the first support ring relative to the first spaced bracket plates, and the second rotary disc is arranged for rotatably mounting the second support ring to the second bracket plates.

* * * * *